UNITED STATES PATENT OFFICE.

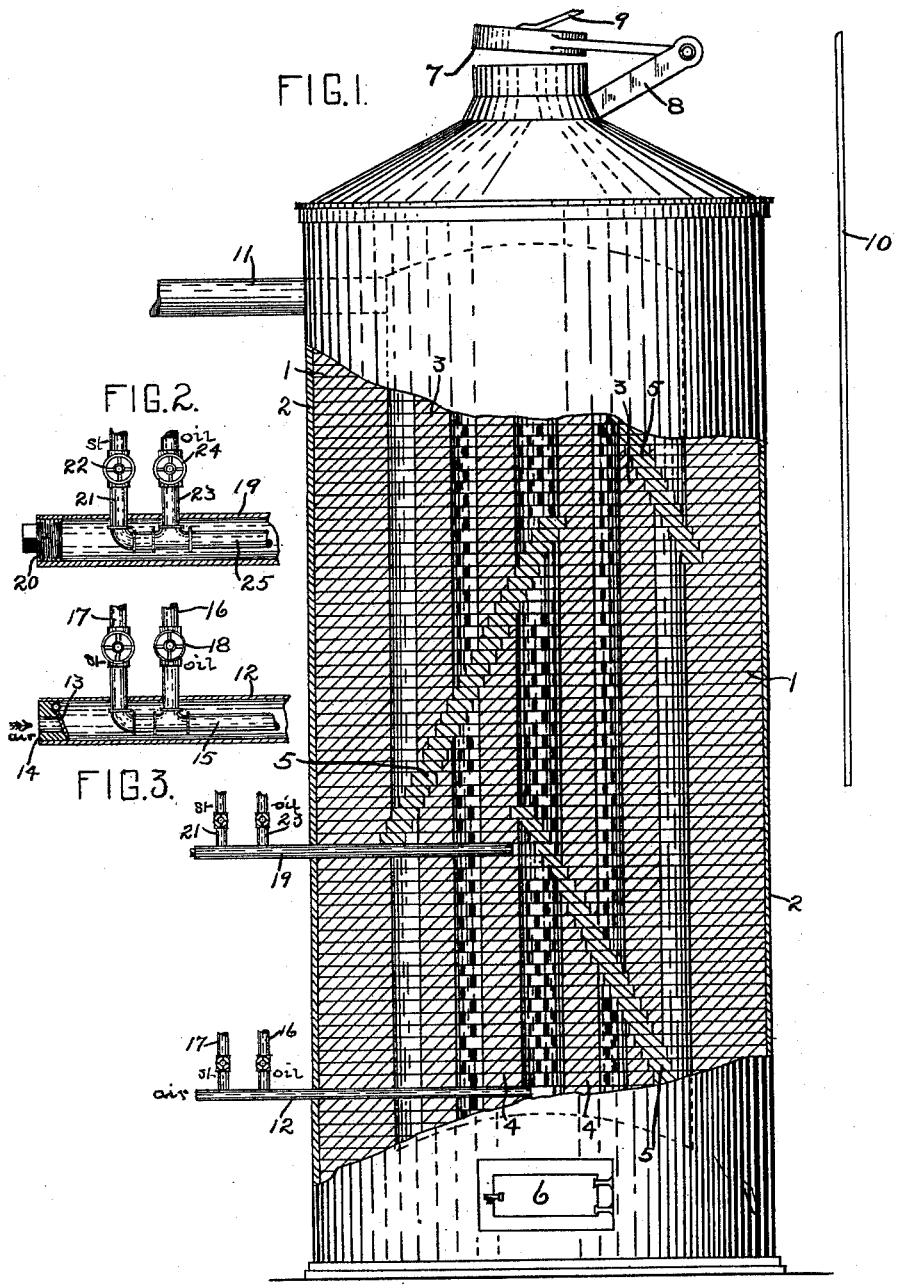

HENRY J. BURT, OF LIBERTY, INDIANA.

GAS-GENERATOR.

SPECIFICATION forming part of Letters Patent No. 592,605, dated October 26, 1897.

Application filed August 19, 1896. Serial No. 603,259. (No model.)

*To all whom it may concern:*

Be it known that I, HENRY J. BURT, of Liberty, county of Union, and State of Indiana, have invented a certain new and useful Gas-Generator; and I do hereby declare that the following is a full, clear, and exact description thereof, reference being had to the accompanying drawings, in which like figures refer to like parts.

My invention relates to a gas-generator for the manufacture of illuminating and fuel gas by the decomposition of steam and oil by causing them to come in contact with highly-heated surfaces. One object in view is to quicken the process of such manufacture by causing a mixing of the oil and steam upon entering the fixing-chamber of the generator and by making such fixing-chamber in such a manner that the heated surfaces will be of large proportionate area and the construction will admit of an easy and general distribution of the material after it enters the chamber and while contacting with such heated surfaces. With this arrangement I am enabled to produce a good quality of gas at a very low price.

The full nature of my invention will appear from the accompanying drawings and the description and claims following.

In the drawings, Figure 1 is a side elevation of the generator with the middle shown in vertical section. Fig. 2 is a detail sectional view of the means for introducing the steam and oil to be converted into gas. Fig. 3 is a detail of the device for introducing fuel for heating the generator.

The body of the generator consists of a cylindrical brick wall 1. About this brick wall there is built an outside metallic covering 2. Within the cylindrical brick wall I provide two other cylindrical brick walls 3 and 4, one within the other, all three of the cylindrical brick walls 1, 2, and 3 being concentric. The inner cylindrical walls 3 and 4 are preferably much narrower than the outer one, and they are both built of open brickwork, whereas the outer wall 1 is solid. The cylindrical brick wall 3 is removed somewhat from the inner surface of the outer brick wall 1, so as to provide an annular chamber between the two walls extending from bottom to top, excepting as hereinafter specified; also, between the inner brick wall 4 and the intermediate brick wall 3 there is a small space forming a chamber extending from bottom to top, excepting as hereinafter specified. The chambers between these various concentric cylindrical walls are partially cut off by a series of half-cones 5, that are built up solid, and the lower half-cone is built on one side of the generator, the cone above it on the opposite side, and the third half-cone on the side opposite to the second half-cone. The bases of these half-cones are set in the outer wall 1, and they extend at an angle across the chamber between the outer and intermediate walls, across the chamber between the inner and intermediate walls, and across the chamber within the inner cylindrical wall. By this means the chamber within the inner cylindrical wall is cut off by each of the half-cones, whereas the other chambers are cut off at one side by one half-cone and on the other side by the next half-cone, and so on, but the chambers between the various walls are not wholly cut off at any place by the half-cones.

At the lower end of the generator there is provided a furnace-door 6 and at the upper end an opening that is closed by the lid 7, pivoted on the arm 8 and operated through the handle 9, from whose outer end the rope 10 extends down within convenient reach. While the generator is being heated, the lid 7 is open, so as to form a flue through the device. When, however, the heating is completed and gas is being formed, such lid is closed. Near the upper end also I provide a pipe 11, leading from the interior of the chamber to the generator for the removal of gas as it is formed.

The generator is heated by the introduction of fuel near its lower end. For this purpose I introduce a large air-pipe 12, which extends, preferably, into the chamber within the inner cylindrical wall 4. In the outer end of the air-pipe 12 I place a gravity check-valve 13, formed by the hollow plug 14, through which air may pass and which has a slanting inner face against which the valve 13 rests as it is drawn down by gravity or forced into its seat by the backward pressure of the gas while gas is being formed in the generator. Within the large pipe 12 extends the pipe 15, conveying crude oil from the pipe 16 and steam through the pipe 17. Each of these pipes is provided with valves 18, whereby the supply of steam and oil is shut off when the chamber has become sufficiently heated and is turned on when it is desired to reheat the chamber. It is obvious that when the steam and oil supplies are turned on a jet will be formed that will draw the air into the pipe 12 through the opening in the plug 14, raising the valve 13, such air mixing with the steam and oil to furnish a properly-combustible fuel for heating the chamber.

In the manufacture of gas the generator is first heated through the means just described until the temperature of the interior construction—that is, the plugs in the cylindrical walls of the half-cones—is raised to about 1,900° Fahrenheit.

It is obvious that by reason of the peculiar construction of the cylindrical walls and the combination with them of the solid half-cones the plugs therein will become very quickly heated. This is due to the great amount of surface of each plug that is exposed to the heated gases within the generator and also to the good distribution of such heated gases that is effected by the arrangement set forth. Nearly all the surface of the plugs is exposed and the vertical passage ways or chambers are all cut off at one or more points by the half-cones, thereby causing a deflection of the heated current. For illustration, the heated current in passing up from the lower portion of the generator is deflected by the lower half-cone through the bricks forming the two sides of the inner cylindrical wall. Then it is deflected in the opposite direction by the half-cone above, and so on, the heated current is kept passing to and fro through the various open-work constructions in the generator. By reason of all the cones crossing the central chamber it is prevented from being a flue through which the heated air would naturally have a tendency to rise directly without distributing itself throughout the whole internal construction.

After the bricks in the internal construction are sufficiently heated, as has been described, the supply of fuel is cut off by means of the valves 18 and the lid 7 at the top is closed, and the material for the manufacture of gas is then introduced through the pipe 19, which preferably extends to a point within one side of the internal cylindrical wall 4, so that any fluid that may pass through it would tend to run down the interior surface of such cylindrical wall 4, where it would be directly acted upon by the highly-heated bricks and readily and immediately converted into gas. The outer end of such pipe is closed by the plug 20. Into such pipe extends a steam-pipe 21, with a valve 22, and the oil-pipe 23, with the valve 24, one coming from a suitable oil-supply and the other from the boiler and the two entering the pipe 25, that extends through the pipe 19 to its inner end.

It is obvious that conversion or decomposition in my generator will be unusually thorough of the mixing of the particles of gas as they pass through the various openings in the cylindrical walls and are deflected by the solid half-cones from one half-cone to another. As soon as the gas is formed and passes out through the pipe 11 the process which has been described is repeated. It is also obvious that my mixer for heating purposes will convey a sufficient supply of oxygen into the chamber while it is being heated, and when the gas is being formed the back pressure of the gas will prevent the entrance of the air, thus rendering the supply of air at one time and the prevention of the air at the other end automatic.

What I claim as my invention, and desire to secure by Letters Patent, is—

1. In a gas-generator, the combination of vertical chambers formed by open brickwork walls, and a series of deflectors across such chambers at various points.

2. In a gas-generator, the combination of vertical chambers formed by cylindrical open brickwork walls, and a series of half-cones built first on one side and then on the other within the generator and across such vertical chambers.

3. In a gas-generator, an outer solid wall, a vertical wall built within such outer wall of open brickwork forming a central vertical chamber and also a chamber between the outer and inner wall, and a series of solid inclined deflecting-walls with their bases set in the outer wall and extending across the internal chamber, one of such inclined deflecting-walls being on one side and the succeeding one above and oppositely located and so on throughout the series.

In witness whereof I have hereunto set my hand this 28th day of July, 1896.

HENRY J. BURT.

Witnesses:
V. H. LOCKWOOD,
ZULA GREEN.